United States Patent [19]

Myers

[11] 4,357,292

[45] Nov. 2, 1982

[54] METHOD OF MOLDING IN SOLID FLOOR PLATE TO A FIBERGLASS REINFORCED MOLDED RESIN GRATING

[75] Inventor: Robert E. Myers, Houston, Tex.

[73] Assignee: International Grating, Inc., Houston, Tex.

[21] Appl. No.: 296,669

[22] Filed: Aug. 27, 1981

[51] Int. Cl.³ .......................... B29D 3/02; B29G 5/00
[52] U.S. Cl. .................................. 264/257; 156/181;
    264/137; 264/258
[58] Field of Search ...................... 264/137, 257, 258;
    156/180, 181, 441, 500, 434; 128/131, 132, 134,
    137, 138

[56] References Cited

U.S. PATENT DOCUMENTS

| | | | |
|---|---|---|---|
| 1,406,160 | 2/1922 | Klug | 425/383 |
| 3,645,833 | 2/1972 | Figge | 428/134 |
| 3,772,126 | 11/1973 | Myers | 264/137 |
| 3,851,038 | 11/1974 | Meyer | 264/334 |

*Primary Examiner*—Willard E. Hoag

*Attorney, Agent, or Firm*—Sughrue, Mion, Zinn, Macpeak & Seas

[57] ABSTRACT

Metal shims are positioned within intersecting slots of a lower mold member, normally employed in the molding of an open grid fiberglass reinforced molded resin grating with the shims being of a height less than the vertical height of the slots. The grating is repositioned in the slots such that the upper ends of the grating bars project above the upper surface of the lower mold member. The upper mold member bearing projecting grids corresponding to the slots is covered with a solid checker plate. An impregnated glass sheet formed of the same molding compound as the open grid molded resin grating is interposed between the checker plate and the grating. A further shim defining the extent of compression of the molding compound sheet is interposed between the lower mold member and the checker plate. Pressure lowering of the upper mold onto lower mold member supported glass sheet is effected while heat is applied to compression mold the glass sheet as a solid floor plate onto one side of the open grid molded resin grating preform.

4 Claims, 5 Drawing Figures

METHOD OF MOLDING IN SOLID FLOOR PLATE TO A FIBERGLASS REINFORCED MOLDED RESIN GRATING

FIELD OF THE INVENTION

This invention relates to the compression molding of fiberglass reinforced molded resin gratings, and more particularly, to a method of molding in a solid floor plate to a premolded, open grid fiberglass reinforced molded resin grating.

DESCRIPTION OF THE PRIOR ART

Non-rusting fiberglass grating has been employed in lieu of steel grating without sacrificing strength, safety or economy. By using matched di-process molds and continuous woven strands of reinforcing fiberglass, together with premium polyester or vinyl resins, the applicant has commercially produced a fiberglass reinforced resin grating of the open grid type in which the grating panel contains more than sixty percent fiberglass by weight and may be formed under six hundred tons of compression, at 220° F. The process insures that the fiberglass is evenly dispersed and fully bonded with the resin.

Compression molded fiberglass reinforced gratings provide many advantages over fiberglass gratings made by other methods. Tests have proven that such compression molded gratings have as much as double the strength of ordinary hand-cast gratings. The strength increase is evident because the product has a more uniform density and because it contains more reinforcing fiberglass.

Finally, since the product is machine-made, the fiberglass content and strength are consistent from panel to panel.

A key to the production of such fiberglass reinforced molded gratings involves the ability to employ endless strands of fiberglass which may be readily woven into the form of the grating and wherein two sets of spaced parallel strands cross each other at an angle (preferably at right angles). The technique employed is the subject matter of my U.S. Pat. No. 3,772,126 issued Nov. 13, 1973, and entitled "APPARATUS AND METHOD FOR MAKING FIBERGLASS GRATING".

The process of the patent involves the weaving of the fiberglass strands bearing catalyzed resin, the quick transfer of a formed grating from a lay up form to a slotted lower mold member which is preheated and forms a part of the press and wherein the resin is temperature cured under pressure in a highly expeditious manner. By wetting of the formed grating with resin, the resin, in reaching the preheated molded, rapidly cures. Alternatively, the strands may be woven dry (untreated by liquid resin) and subsequent to transfer of the dry grating strands into the mold, the grating is wetted in the mold for almost instant resin curing.

While this produces a commercially usable product (subject only to possible sanding to remove the flash created during the molding process from the edges of the molded product which are uppermost in the mold), and the product has been the subject of intense commercial success, particularly for use in the oil industry or in the chemical processing art where the chemicals would be excessively corrosive on steel grating, and wherein there is the elimination of the possibility of sparking as from the steel grating, not all commercial needs are met by open mesh grating. While the open mesh grating provides extreme strength, under some circumstances, it is desired to have a solid plate as the ultimate support surface, rather than an open grid grating through which objects may readily pass.

In order to obtain such a product, in the past, solid top plates have been glued or riveted as a solid sheet to an existing open grid grating. Such structures may meet a purpose, at least initially, but the assemblies can fail in time due to the difference in deflection of the solid sheet and the underlying grating element.

It is, therefore, an object of the present invention to provide a method of manufacture of a molded in solid floor plate type fiberglass reinforced molded resin grating in which the the molding in process employs the same apparatus employed in the production of the open grid grating itself to effect an integrated molded product which eliminates problems in deflection differences between the solid sheet and the open mesh grating preform and which greatly reduces the possibility of delamination.

SUMMARY OF THE INVENTION

The present invention is directed to a modification of a process which involves initially the steps of positioning resin coated fiberglass strands in overlapping fashion within respective intersecting sets of slots within a first, slotted, lower mold member, compressing the strands and resin within the slots by driving an upper mold member downwardly towards the lower mold member with the upper mold member bearing a grid plate including intersecting sets of projecting grids conforming in number, location and size to the slots of the lower mold, but having projections which are of a height less than that of the slots within the lower mold member. With the sets of projecting grids penetrating a given distance into the slots of the lower mold member, and upon application of heat, there is effected by heat, under pressurization, the molding of the fiberglass strands and resin into an open grid fiberglass reinforced molded resin grating.

The improvement resides in initial replacement of the open mesh grating with metal shim members within the slots of the lower mold member, with the slot shims being of a height less than the height of the slots, replacing the open grid grating within the slots and onto the slot shims, placing a sheet of molding compound overlying the lower mold and in contact with the projecting ends of the open mesh grating and compressing the sheet of molding compound under applied heat by lowering the upper mold member, bearing an imperforate checker plate on its bottom surface, against the upper face of the molding compound sheet to effect pressure molding of the sheet to the open mesh grating.

Further metal shims may be interposed between the upper face of the lower mold bearing the slots and the checker plate to limit the extent of compression of the sheet of molding compound material. The sheet of molding compound material may comprise a sheet of fiberglass reinforced resin of identical composition to that forming the open mesh molded resin grating preform. The checker plate may have its bottom surface patterned for contact with the sheet of molding compound material to provide a non-skid surface to the solid floor plate overlying the open grid grating.

DESCRIPTION OF THE PREFERRED EMBODIMENT

Figure 1:
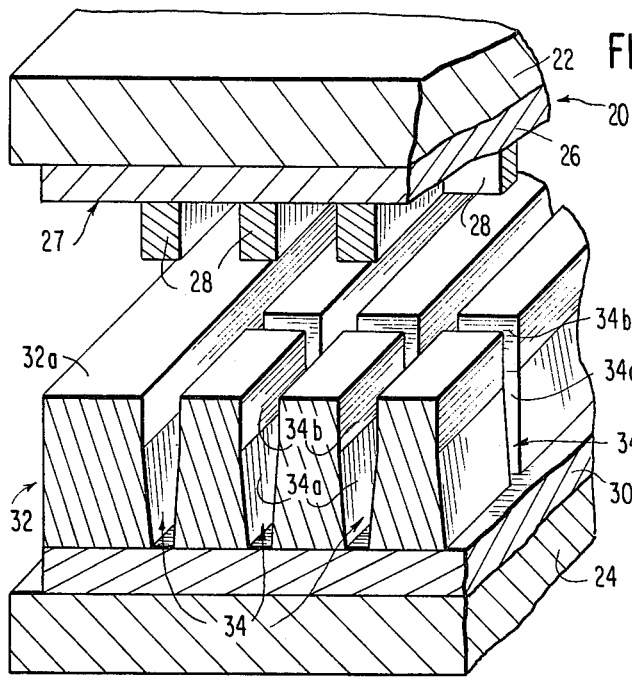
FIG. 1 is an exploded, perspective view of a portion of the components of a press employed in the manufacture of solid floor plate molded in, fiberglass reinforced molded resin grating, utilizing the method of the present invention.
Figure 2:
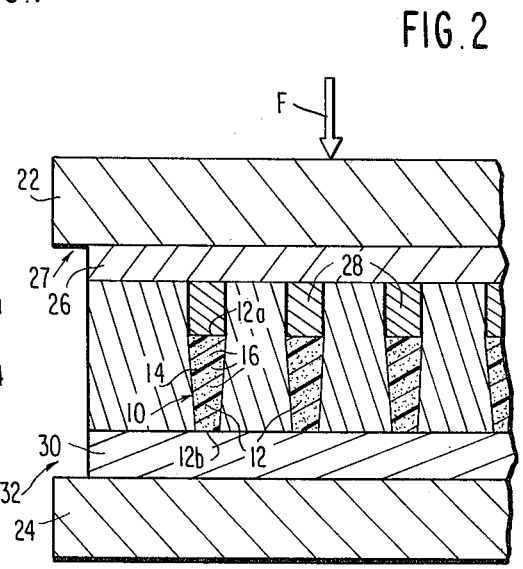
FIG. 2 is a vertical sectional view of the molding press during molding of the initial open grid grating or preform.

Turning first to FIGS. 1 and 2, these two figures depict the compression mold and the process of manufacture of applicant's principal product in trade, that is, an "open grid" grating, indicated generally at 10, FIG. 2, and comprised of right angle, intersecting bars 12 formed of resin 14 within which is embedded fiberglass strands as at 16, FIG. 2. The compression molding apparatus indicated generally at 20 for achieving the molding operation and comprising an upper steam plate 22, a lower steam plate 24, an upper mold grid plate 26 bearing integral grid members 28 projecting downwardly from the grid plate proper and being of rectangular cross-section. The lower steam plate 24, which preferably is fixed, is provided with a base plate 30 overlying the same and upon which is fixedly mounted, members forming a slotted lower mold member indicated generally at 32, while the upper mold member, indicated generally at 27, is formed by upper steam plate 22, grid plate 26 and the grid members 28. The lower mold member 32 is provided with a series of right angle intersecting slots, indicated generally at 34, which in each instance taper upwardly and outwardly over about two-thirds the height of the slot, forming a first lower slot portion 34a which is diverging, and an upper vertical and straight wall portion as at 34b. Further, the grid members 28 of the upper mold member 26 are of a vertical height equal to the straight wall portion 34b of slot 34. As may be readily envisioned, by reference to my earlier U.S. Pat. No. 3,772,126, after the formation of the woven endless fiberglass strands in the winding form (not shown) and upon the strands being subjected to the liquid resin and transfer to the slots 34, as seen in FIG. 2, during compression of the resin 14 and the fiberglass strands 16 within the mold cavity, as defined by slot 34, upon the application of a compressive force as indicated by the arrow F, FIG. 2, and upon heat being applied through the upper and lower steam plates 22 and 24, a high density very solid open grid fiberglass grating 10 is effected, which in the instant case comprises a grating preform for subsequent process steps which may be seen by further reference to FIGS. 3 and 4.

Exemplary, the fiberglass grating may be molded by the application of heat, by raising the upper and lower steam plates 22 and 24 to temperatures on the order of 220° F., while a compressive force of six hundred tons is applied thereto, as evidenced schematically by the arrow F, FIG. 2, to effect the formation of the open grid grating preform 10, FIG. 2.

As is conventional, upon the upward movement of the upper mold member 27, away from lower mold member 32, the open grid grating 10 may be removed. The grating 10 is preferably run through a sanding machine functioning to sand off the bottom or wide side surfaces 12a, FIG. 2, to remove the flash and to expose the resin and glass on the side to be adhered to by the solid floor plate.

Figure 3:
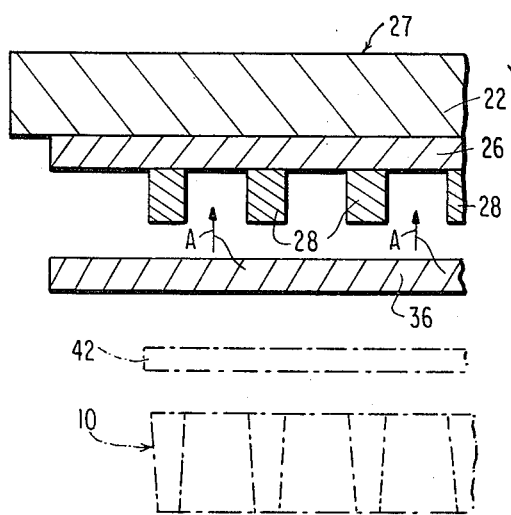
FIG. 3 is an exploded, vertical sectional view of the molding press modified to effect "molding in" of a solid floor plate to the open grid grating preform manufactured in the manner of FIG. 2.
Figure 3:
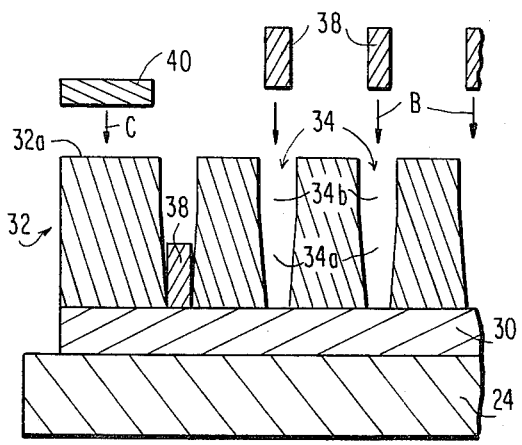

Reference to FIG. 3 shows in exploded form the further modification of the upper and lower mold members 27 and 32. In this case, a checker plate as at 36 which may be formed of steel or the like, is fixedly mounted to the bottom of the upper mold member 27, as per arrow A. Specifically it is flush mounted to the bottoms of the grid members 28 projecting downwardly from the grid plate 26 of the upper mold member 27. Additionally, two sets of metal shims are provided to the lower mold member 32. A first set of shims 38 are positioned within slots 34, as shown by arrows B, with some shims 38 being at right angles to each other so as to fill the bottom of all slots 34 to a height which is somewhat below the line of demarcation between the slot diverging portion 34a and the straight wall portion 34b. With the shims 38 in place, the molded fiberglass grating preform 10 is inserted within the upper portion of slots 34. Further, a second series of metal shims 40 are mounted to the periphery of the lower mold member 32, as per arrow C, FIG. 3. The height of the shims 40 determines the extent of compression of an impregnated glass sheet 42 formed of a molding compound, FIG. 3, as in the manner shown in FIG. 4. In that respect, the preform 10 and the molding compound sheet 42 are indicated in dotted line, FIG. 3, since they are not elements of the apparatus but are employable in the method to form the molded in solid floor plate fiberglass reinforced resin grating, illustrated at FIG. 5.

Figure 4:
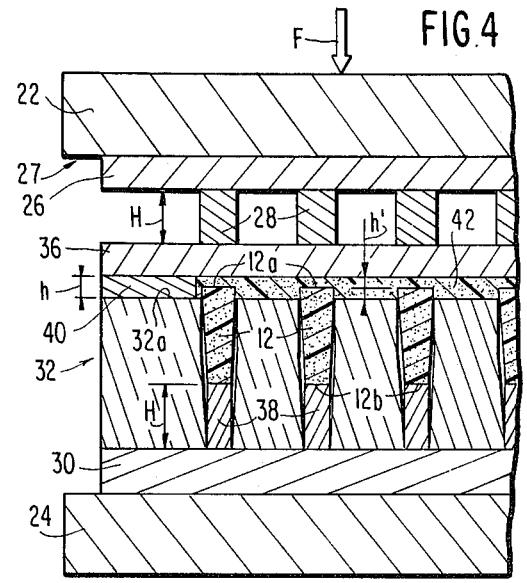
FIG. 4 is a vertical sectional view of the molding press as modified, during the molding in of the solid floor plate to the open grid grating preform.
Figure 5:
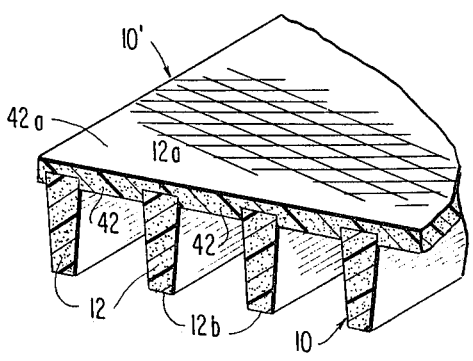
FIG. 5 is a perspective view of a portion of the molded-in solid floor plate reinforced fiberglass molded resin grating as manufactured under the process of the present invention.

With the shims 38 and 40 in place, it is to be noted that during the molding in process, or second molding step, again a high compressive force is applied, FIG. 4, shown as arrow F, against the steam plate 22 of the upper mold member 27. Further, preferably, the shims 38 have a height H (on the order of one and one-quarter of an inch in the illustrated embodiment) which is in excess of the height H' of the grid members 28 for the upper mold member 27. This causes the end faces 12a of the open grid grating 10 to be above the surface 32a of the lower mold member 32. In the illustrated embodiment of FIG. 4, the upper ends of the grating preform bars 12 are approximately one-quarter of an inch above the upper surface 32a of the lower mold member 32. With the shims 40 in place on the periphery of that mold member 32 (and functioning as dams for the molding compound when in molten form), since the vertical height h of the shims 40 is about twice the height of the projecting ends 12a of the grating preform, under the applied pressure as indicated by arrow F during the second compression molding step, the checker plate 36 presses against the upper surface of the impregnated glass sheet of molding material 42 and continues to act through that checker plate 36 until it contacts the surface of the shims 40. At this point further compression of the molding compound sheet 42 ceases. With the application of a compressive force as at F which again may be on the order of six hundred tons, simultaneously heat is applied on the order of 220° F. or less and the molding compound softens to cause it to mold integrally with the ends of the open grid grating preform bars 12. Preferably, the lower surface of the checker plate 36 is provided with a diamond or other non-skid pattern so as to produce a molded in non-skid surface as indicated at 42a, FIG. 5, for the molded in fiberglass reinforced molded resin solid floor plate grating 10' with the grating bars projecting downwardly but integral with the solid floor plate 42. With the checker plate 36 shimmed by way of shims 40, the checker plate 36 only comes down far enough to press a solid floor onto the upper ends of the grating bars 12 forming the open grid grating 10 to produce an imperforate flooring product whose plate thickness is sufficient to impregnate the upper ends of the grating bars 12 and securely lock the molded in solid floor plate 42 to the open grid grating preform 10.

As may be appreciated, if the shims 38 are of a height such that the grating bars 12 do not project upwardly above the level of the slotted lower mold member 32, the second compression molding step will melt the molding compound sheet 42 and still cause it to unite with the end faces 12a of the grating bars with the slots. However, in this case, there will be not embedding of the bars into the sheet and the structure is weaker than that of the illustrated embodiment. In the extreme, with the shims 38 being of such short height H as to be less than the height H' of the upper mold grid members 28, compression of the molding compound sheet 42 will cause some compound to flow downwardly into the upper solt portions 34b of slots 34 for the lower mold member 32 and will cause the molding compound sheet 42 to be pressure molded against the upper ends of grating bars 12.

It should also be appreciated that since the upper slot portions 34b are wider than the upwardly diverging lower slot portions 34a, during molding in accordance with the embodiment of FIG. 4, some of the molding compound, when molten or soft, seeps between the sides of the grating bars 12 and the walls of the lower mold member 32 forming the slot portions 34b so that molding material is integrally molded with the grating bars 12 of the grating preform 10 over a certain portion of their height. Subsequently, the sanding machine may be employed in sanding off the lower ends 12b of the grating bars including some of the molding material if it flows down between the grating bars 12 and the walls of the lower mold member defining the slots 34, to the extent of the upstanding shims 38.

While the invention has been particularly shown and described with reference to a preferred embodiment thereof, it will be understood by those skilled in the art that various changes in form and details may be made therein without departing from the spirit and scope of the invention.

What is claimed is:

1. In a process for molding fiberglass reinforced resin gratings, said process comprising the steps of:

laying resin coated fiberglass strands in overlapping fashion within intersecting sets of slots within a slotted lower mold member, driving an upper mold member downwardly towards said lower mold member with said upper mold member bearing a set of intersecting downwardly projecting grid members in number, location and width to the slots of the lower mold and causing said grid member to penetrate said slots to a predetermined distance to effect compression of said strands and resin within the slots of said lower mold member, while applying heat to effect under heat and pressure the molding of an open grid grating preform of intersecting bars, raising of the upper mold member and removing of the molded fiberglass reinforced resin grating preform, the improvement comprising:

providing first shims within the slots of the lower mold member to a height less than the height of said slots, lowering the open grid grating preform within the slots and in contact with said first shims, interposing a sheet of molding compound material between said checker plate and the upper surface of said lower mold member and onto said grating preform, lowering the upper mold member under compressive force with an imperforate checker plate interposed between the projecting grid members of said upper mold member and said mold compound material sheet, and compressing said sheet of molding compound material while applying heat thereto to mold said molding compound material sheet to the upper ends of the grating bars of said molded grating preform to form a molded in solid plate fiberglass reinforced molded resin grating product resin of said sheet of molding compound material being at least softened and by compression caused to flow and bond to said upper ends of the grating bars.

2. The method as claimed in claim 1, wherein said first shims are of a height in excess of the height of the grid members, such that the ends of said grating bars extend above the top of said lower mold member and are embedded within the sheet of molding compound material during the second compression step.

3. The method as claimed in claim 2, further comprising providing at least one second shim between the checker plate and the lower molding member outside of the molding compound sheet to regulate the amount of compression of the molding compound material sheet about the upper ends of said grating bars.

4. The method as claimed in claim 1, wherein said first shims positioned within said slots have a height in excess of the height of the grid members borne by said upper mold member, and wherein the said at least one said shim positioned about the molding compound sheet and interposed between the checker sheet and the lower mold member has a height which prevents said molding compound sheet to be compressed to a thickness less than the height of the ends of said grating bars projecting above the level of the upper surface of said lower mold member bearing the slots within which the first shims and the grating bars are mounted prior to the compression molding in step of said solid plate.

* * * * *